United States Patent [19]

Frey et al.

[11] Patent Number: 4,577,065

[45] Date of Patent: Mar. 18, 1986

[54] MEET-ME CONFERENCE ARRANGEMENT

[75] Inventors: Alan E. Frey, Naperville; Howard A. Kerr, West Chicago, both of Ill.

[73] Assignee: AT&T Bell Laboratories, Murray Hill, N.J.

[21] Appl. No.: 548,433

[22] Filed: Nov. 3, 1983

[51] Int. Cl.⁴ .............................................. H04M 3/56
[52] U.S. Cl. ............................................... 179/18 BC
[58] Field of Search ...................... 179/18 BC; 370/62

[56] References Cited

U.S. PATENT DOCUMENTS

| | | | |
|---|---|---|---|
| 3,144,518 | 8/1964 | Lummis | 179/18 BC |
| 4,153,817 | 5/1979 | D'Ortenzio | 179/18 BC |
| 4,229,814 | 10/1980 | Betts | 370/62 |
| 4,305,149 | 12/1981 | Harrison | 370/62 |
| 4,340,960 | 7/1982 | Moran | 370/62 |
| 4,460,807 | 7/1984 | Kerr et al. | 179/18 BC |

Primary Examiner—Thomas W. Brown
Attorney, Agent, or Firm—Charles H. Davis; Richard J. Godlewski

[57] ABSTRACT

A telephone switching office having a plurality of meet-me conference bridging systems is disclosed. An access code is assigned to each conference, and at an agreed upon time, all conferees for a conference dial the same access code. The switching office allocates a bridging system in response to the first call to arrive at the office. In the event more than one call for the same conference arrives at the host office concurrently, the processing of all but one call is delayed until an idle bridging system is connected to that one call. The delayed calls, and any future calls to the conference are then steered to the same bridging system.

11 Claims, 6 Drawing Figures

MEET-ME T/C STATUS TABLE

| T/C ID | STATUS | | | NO. OF LEGS COUNTER | TRK GRP NO. |
|---|---|---|---|---|---|
| | IDLE | HUNTING | ACTIVE | | |
| 123 | | | | | |
| 456 | | | | | |
| ⋮ | ⋮ | ⋮ | ⋮ | ⋮ | ⋮ |
| XXX | | | | | |

TRUNK REGISTER

| TRK USE | T/C ID |
|---|---|
| MEET ME T/C | |

MEET-ME CONFERENCE ARRANGEMENT

TECHNICAL FIELD

This invention relates to communication systems and particularly to conferencing arrangements.

In a more particular aspect, this invention relates to "meet-me" conference arrangements whereby a plurality of customers establish a conference by simultaneously dialing an access code at a prearranged time.

In a still more particular aspect, this invention relates to meet-me conference arrangements, and method and apparatus for controlling the interconnection of conferees to a plurality of conference bridging systems.

BACKGROUND OF THE INVENTION

In a communications network, it is desirable to provide conferencing service whereby a plurality of widely separated customers can engage a conference bridge to exchange information. The information to be exchanged could be in the form of voice messages over telephone lines coupled to an audio bridge or the customers could exchange data via a data bridge.

One such combined audio and data conference arrangement is disclosed in U.S. Pat. No. 4,475,189 of D. E. Herr et al., issued Oct. 2, 1984. While the Herr et al. patent discloses an arrangement that is wholly suitable for its intended purpose, it is essentially a dial-up system whereby an originator summons each of the other conferees by dialing their respective station addresses.

Other arrangements, known as meet-me conference systems, are utilized by having each conferee dial, at an agreed upon time, a code associated with the conference bridge. One such meet-me conference arrangement is disclosed in U.S. Pat. No. 3,144,518 issued to B. D. Lummis on Aug. 11, 1964. In the Lummis patent, each leg of a conference is assigned to a terminal on a connector switch. By dialing the directory number assigned to the conference bridge, each conferee can establish a voice connection to a corresponding leg of the bridge.

While the Lummis arrangement is suitable for its intended purpose, it has certain limitations. For example, since only one bridge is provided and should the conference bridge be out-of-service, those customers attempting to establish a conference at a prearranged time would be frustrated.

SUMMARY OF THE INVENTION

The foregoing problem is solved and a technical advance is achieved by a meet-me conference arrangement having a plurality of conference systems, and method and apparatus for allocating the conference systems and facilities for access thereto in response to a request for conference service.

More specifically, the invention is embodied in a telephone network having a plurality of meet-me conference systems. When a customer requests the use of one of the conference systems, a determination is made if space facilities are available, and a conference access code is assigned to the conference and relayed to the customer.

At the agreed upon time that the conference is to take place, all conferees dial the conference access code assigned to their conference. When the first call arrives at the switching office which has access to the conference systems, a conference system is allocated to the assigned access code, and the conferee is connected to the allocated system. Thereafter, as each conferee's call is extended over the network by using the same access code, the call is forwarded to the same allocated conference system.

In accordance with a feature of the invention, when a plurality of calls for the same conference concurrently arrive at the switching system having the conference systems, call processing for all calls but one is temporarily halted until an idle conference system is allocated.

DETAILED DESCRIPTION

Figure 1:
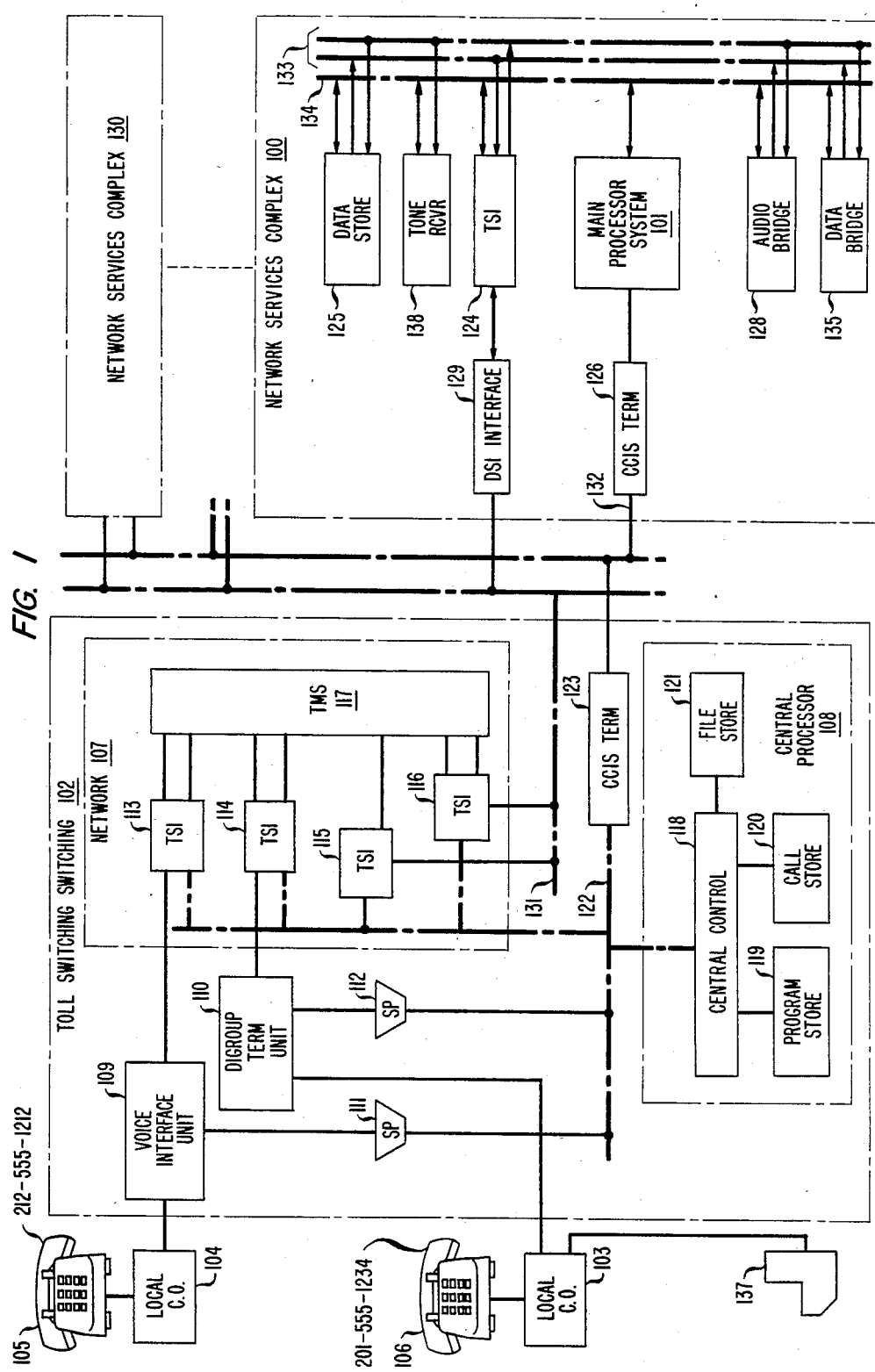
FIG. 1 shows a block diagram of a typical telephone network having a switching system equipped with a plurality of conference systems.

The general organization of a system employing the invention is illustrated in the block diagram of FIG. 1 which shows a typical communications network having a toll switching system 102 which serves local telephone central offices 103 and 104. Central offices 104 and 103 contain the switching apparatus for providing telephone service to customer stations 105 and 106, respectively. Also connected to central office 103 is teleconference operator position 137. Connected to switching system 102 are a plurality of network services complexes, such as 100 and 130, for providing special services such as conferencing.

Network services complex 100 includes a main processor system 101, data store system 125, audio bridge system 128, data bridge system 135, a plurality of tone receivers such as 138, and other units. As will be described in more detail below, one of the functions of complex 100 is to provide conferencing with announcements and instructions to customers over the telephone network via the toll and local switching offices.

Toll switching system 102, as depicted in FIG. 1, is a typical switching system, such as, the 4ESS TM electronic switch which is manufactured by AT & T Technologies, Incorporated. This switching system is described in detail in the *Bell System Technical Journal*, Vol. 56, No. 7, September 1977, and need not be fully described herein for the reader to understand the present invention.

Switching system 102 comprises a network 107, a central processor 108, voice interface unit 109, digroup terminal unit 110, signal processors 111 and 112, and miscellaneous equipment units that have not been shown to simplify the drawing.

Network 107 has a time-space-time switching configuration utilizing time slot interchange (TSI) units 113–116, and time multiplexed switch (TMS) unit 117.

Access to the switching network 107 is via serial pulse code modulation links each accommodating 120 voice channels. However, central offices 103 and 104 can be connected to toll switching system 102 via analog or digital transmission facilities. Thus, as seen in FIG. 1, local central office 103 is connected to the toll office over the digital facilities which terminate in digroup terminal unit 110, while local office 104 is connected via analog trunks to voice interface unit 109. Digroup terminal 110 performs the multiplexing and demultiplexing between the interoffice transmission facilities and network 107 and also processes signaling information via signal processor 112.

The analog trunks are terminated in a voice interface unit such as 109 whose principal function is analog-to-digital conversion (and vice versa) plus formatting digital data for the TSI units. Voice interface unit 109 communicates with the central control via signal processor 111.

Signal processor 111 provides the scan, distribute and digit reception tasks for analog trunks, while signal processor 112 performs the equivalent tasks for the digital trunks, except that instead of physical scan and distribution points, the supervisory states of each trunk are stored in a memory in the signal processor.

The majority of the logic, control, storage and translation functions required for the operation of the toll switching system are performed by central processor 108. A typical processor suitable for use in the illustrative toll switching system is described in the *Bell System Technical Journal*, Vol. 56, No. 2, February 1977.

Central control 118 is the information processing unit of the system and executes the program instructions resident in program store 119 using the call processing data in call store 120. Central control 118 communicates with the peripheral units via bus 122.

As mentioned above, interoffice signaling information is extracted from the transmission paths of analog and digital trunks by signal processors 111 and 112, respectively, and used by central control 118 for call processing. However, the signaling for certain trunks may be transmitted between the offices over a common data link separate from the transmission paths using a common channel interoffice signaling system. A typical common channel interoffice signaling system is described in the *Bell System Technical Journal*, Vol. 57, No. 2, dated February 1978, and is represented herein by CCIS blocks 123 and 126, and data link 132.

Coupled to the toll switching system are a plurality of conferencing systems, such as network services complex 100 and 130. Complex 100, which is typical of all complexes, comprises a main processor system 101, a data bridge system 135, an audio bridge system 128, CCIS terminal 126, DS-1 interface 129, time slot interchange 124, data store announcement system 125 and a plurality of tone receivers, such as 138. Network services complex 100 can also include other units such as additional conferencing bridges, speech recognition systems, data processing units, etc.

The network services complex is disclosed in U.S. Pat. No. 4,475,189 of D. E. Herr et al., issued Oct. 2, 1984, and the reader is directed to that disclosure for a more detailed description of the network services complex. In order to appreciate how the present invention is utilized in a system such as the network services complex, a brief overview of the complex and its various subsystems will be given herein, but it will be obvious to one skilled in the art that the present invention is equally applicable to other conference systems without departing from the spirit and scope of the invention.

It is intended that network services complex 100 function with many different types of switching systems to provide several special services in addition to those mentioned above. As such, complex 100 has been designed to connect to a switching system via conventional interoffice trunks 131 and a CCIS type data link 132. The interoffice trunks 131 serving complex 100 are digital facilities similar to the trunks between toll office 102 and local office 103 as described above, and the data link 132 and its terminals are similar to those described in the 1978 *Bell System Technical Journal* cited above. Although these terminals are referred to as CCIS terminals, it is not essential that they be integrated in the CCIS signaling system used for call processing in the network.

The network services complex is modularly designed to allow for various service units to be added. All units are interconnected over a data bus 133 and a control bus 134. The control bus is used by the NSC processor 101 to communicate control, status and error information with the various units in the complex. Program associated data, billing data, etc., which is distinguished from customer data to be conferenced, is also transmitted over control bus 134. Data bus 133, which conveys the customer data to be conferenced, consists of a transmit bus and a receive bus, and each bus is a 256 time slot, time-multiplexed PCM data bus.

Interface 129 connects the T1 trunks from toll switching system 102 to time slot interchange unit 124 which, under the direction of processor 101, switches any time slot in the receive T1 bus or the transmit portion of data bus 133 with any time slot on the T1 transmit bus or the receive portion of data bus 133. Thus, the interface 129, time slot interchange 124, and bus 133 provide the path for the exchange of voice, data, announcements and inband signaling between the toll switching system 102 and units of the network services complex.

The network services complex 100 is controlled by a main processor system 101 which performs or initiates all call processing, maintenance, fault recovery, diagnostics and audits for the entire complex. Processor 101 also interfaces with terminal 126 to transmit and receive messages from the host toll switching system 102.

As mentioned above, the network services complex can be equipped to furnish many services. For purposes of illustration, let it be assumed that the complex is equipped for meet-me conferencing with voice prompting. Accordingly, the complex comprises an audio bridge system 128 which is used for combining the digital voice samples of speakers on a conference for distribution to other participants of the conference. Data bridge system 135, on the other hand, receives data from each conferee's data terminal and distributes the data to the other conferees at the correct speed, in the proper format, etc. The term, data, when used with respect to information transmitted by a customer, is meant to include digital representation of video signals, facsimile, signals from devices such as electronic chalk boards, etc., which is separate from the voice and tone signals transmitted by the customer.

Network services complex 100 also includes a data store system 125 for furnishing tones and announcements to instruct the customers in the use of the special services, and a tone receiver 138 which receives the tone signals representing digits generated by the customer in establishing and controlling a conference.

The control interface between the network services complex systems and the toll switching system 102 is via a main processor system 101. It is via the main processor that orders are exchanged between the network services complex and the toll switching system.

DS-1 interface 129 in this embodiment provides an interface for up to five T1 trunks (120 channels or time slots) which terminate on time slot interchange unit 124. The time slot interchange unit in turn, functions to switch these circuits with 256 time slots on time multiplexed data bus 133 to interconnect the channels with the various service units in the network services complex. Thus, voice, data, and signaling information incoming over the toll telephone network from a conferee is forwarded via interface 129, and time slot interchange 124 to the audio and data bridges for conferencing or to the tone receiver for digit detection and collection, while announcements and tones from data store system 125 and conference data from the bridges are transmitted back via the time slot interchange over the toll network to the conferees.

As noted above, meet-me conference calls are established by having all conferees dial a special access code at a prearranged time in order to "meet" on a conference bridge. Prior to setting up the conference, the person originating the conference obtains the conference access code. While the present arrangement is not limited to the specific manner in which the access code is obtained, it will be appreciated that the user could dial a teleconferencing operator at position 137 who has access to the conference resources that are available and to the list of conference access codes that are used for accessing the conference systems. In the alternative, a customer could directly dial a facility such as the network services complex disclosed in the above cited Herr et al. patent, and the network services complex could be programmed to interact with the caller in allocating resources and accouncing an access code for the meet-me conference systems to be used.

In any event, the conference originator obtains a conference access code and informs all conferees of the code and the time that the conference is to be held.

At the appropriate time, each conferee dials the access number which might take the form 900-NXX-XXXX. The initial three digits, 900, represent the universal code which may be used on a national basis to indicate meet-me teleconferencing service. The next three digits, NXX, indicate the conference number and may also indicate a particular bridge location. Since the conference system is designed to function on a national and international basis, it would be desirable to select a bridging system which minimizes the length of the conferee legs. Thus, if the conferees were geographically located in one area of a country, a bridge could be assigned accordingly, so that the bridge was centrally located to most of the conferees.

The last four digits of the access code might be used to designate other criteria for the meet-me conference such as the number of legs, special billing, etc.

The number dialed by a conferee is translated by the conferee's local switching office and routed through the network to a host switching center, such as 102, which serves several conference systems as shown in FIG. 1. Switching system 102 processes the call according to the sequence of operations about to be described with reference to FIGS. 2-4.

Figure 2:
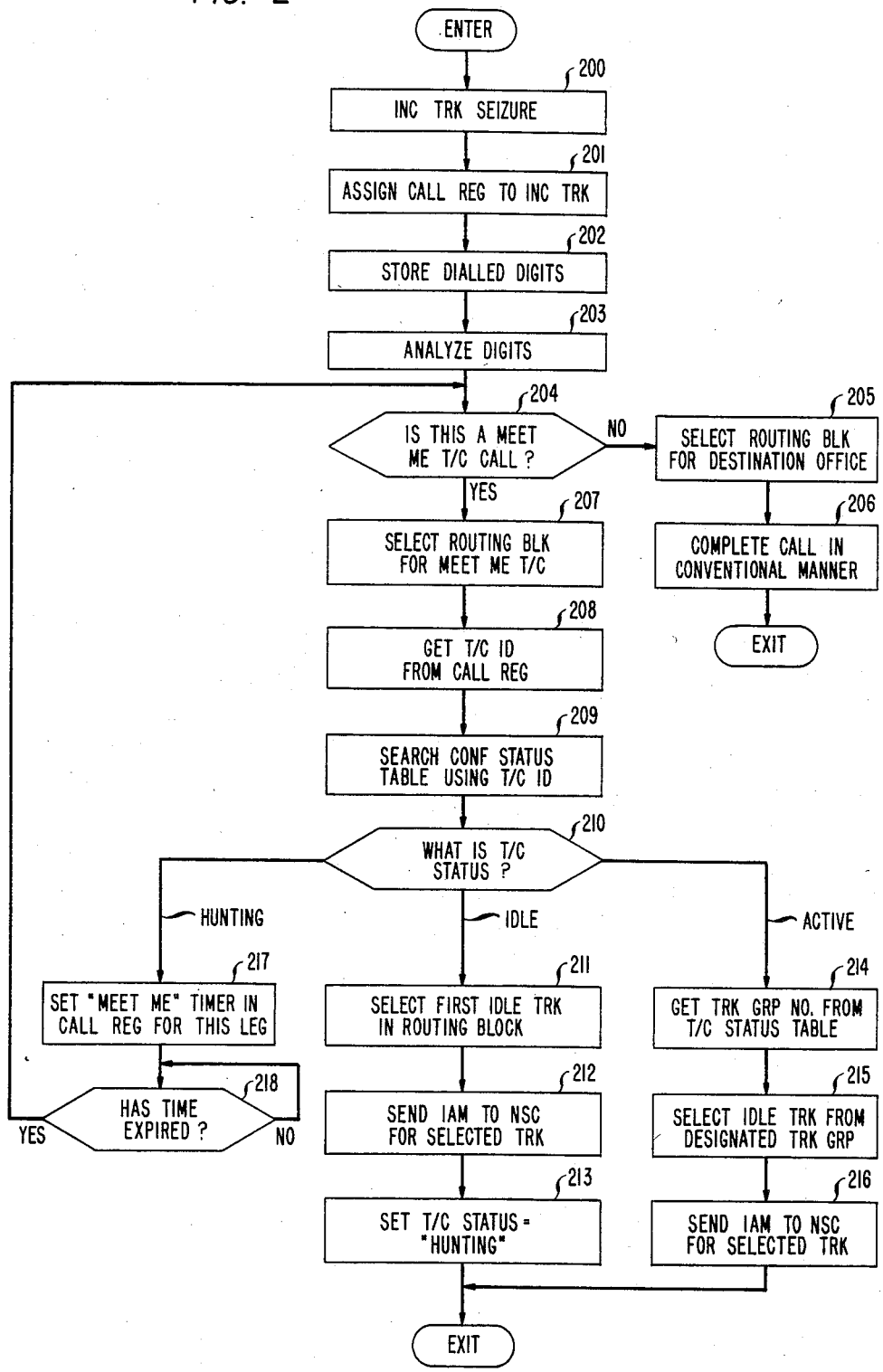
FIGS. 2-4 show a flow diagram depicting the operation of the arrangement.

More specifically, upon recognizing the incoming trunk seizure as shown in box 200, FIG. 2, central control 118 assigns a call register to the incoming trunk and begins collecting and storing in the call register the digits forwarded from the preceding switching office (boxes 201 and 202). A call register, which is a portion of the call store memory, is assigned to each call and is used to store information relating to call processing.

When sufficient digits have been collected, the digits are analyzed by central control 118 to ascertain the routing of the call. This route translation function is well known to those skilled in the art and need not be described in detail herein. However, as the flow diagram of FIG. 2 indicates, central control 118 ascertains whether or not this is a teleconferencing meet-me call by analyzing the digits as shown in boxes 203 and 204. All calls other than meet-me conference calls are processed in a conventional manner by selecting a trunk to the appropriate destination and forwarding the call over the trunk as described in boxes 205 and 206.

In the case of a meet-me conference call, central control 118 gets the teleconference identification from the call register by examining the fourth, fifth, and sixth digits stored therein. Using these digits which identify the conference, central control 118 searches the conference status table to ascertain the status of the conference as indicated in boxes 209 and 210.

Figures 4, 5, 6:
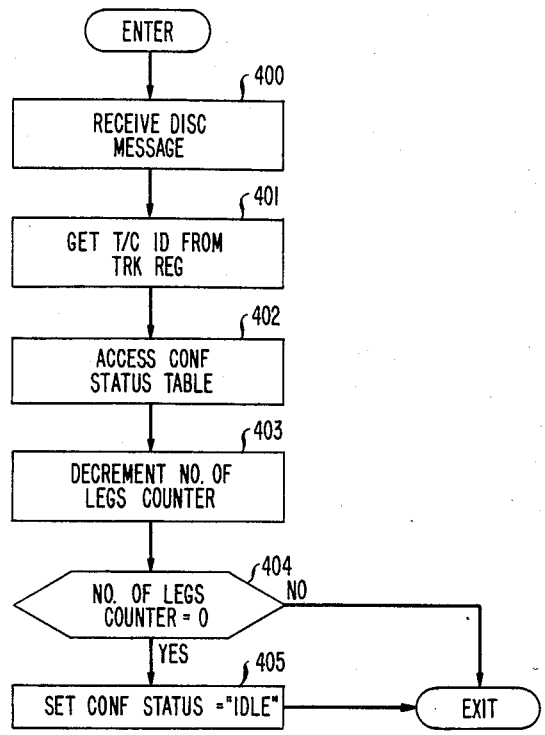
FIGS. 5 and 6 show pictorial representations of portions of the call store memory used in processing conference calls.

Each meet-me teleconference has an entry in a status table resident in call store 120 of the host switching system. A pictorial representation of the memory is shown in FIG. 5, and associated with each conference are entries indicating the conference status, the number of legs that are currently active, and the identity of the trunk group (i.e., conference bridge) serving the conference. Of course it will be obvious to one skilled in the art that other information such as billing can be stored in the conference status table within the spirit and scope of this invention.

In accordance with one aspect of the invention, a conference can be in any one of three states designated "idle" "active" and "hunting". A conference is considered in the "idle" state before any conferee has requested connection thereto, and the conference becomes "active" upon the actual connection of the first conferee to the bridging system allocated to that conference. Since a meet-me conference is established by all conferees concurrently calling the same access code, a situation may arise whereby several calls arrive at the host switching office at substantially the same time. Accordingly, the first call to be processed puts the conference in a "hunting" state while the central control attempts to find an idle conference bridge. Other calls being processed at this time and destined for the same conference are put in a "hold" state until the first call is completed to a bridging system having sufficient idle resources to serve the needs of the conference.

Returning now to a description of the call processing events as depicted in FIG. 2, let it be assumed that central control 118 is processing the first call destined for a conference and, upon the execution of box 209, ascertains that the conference is idle. Central control 118 now selects an idle trunk in a trunk group designated by the routing block that was ascertained when the dialed digits were analyzed.

To facilitate trunk selection, each network services complex is served by a separate trunk group. Thus, when the central control 118 selects an idle trunk in a trunk group, it is effectively selecting a particular network services complex having meet-me bridging facilities. Since no bridging system has been allocated to the conference at this time, the central control 118 is free to search for an idle trunk in any one of the trunk groups serving the plurality of network services complexes connected to switching system 102. Upon selecting an idle trunk to a network services complex, such as 100, central control 118 sends an "initial address message" (box 212) over data link 132 and waits for a response from the network services complex. In addition, central control 118 changes the status of the conference in the conference status table to "hunting" by executing box 213.

While central control 118 is waiting for a response back from the network services complex, for the first conferee, central control 118 continues processing other calls including calls for the same conference. Should another call for the conference be received, central control 118 would now examine the status table for this conference and find that the conference is in a "hunting" state. Central control 118 would then set a software timer in the call register associated with this call as shown in boxes 217 and 218. This, in effect, puts subsequent calls in a queue and temporarily delays the completion of these calls until the first call has been processed to the point where an idle conference bridge having sufficient capacity has been found and allocated to the conference.

Figure 3:
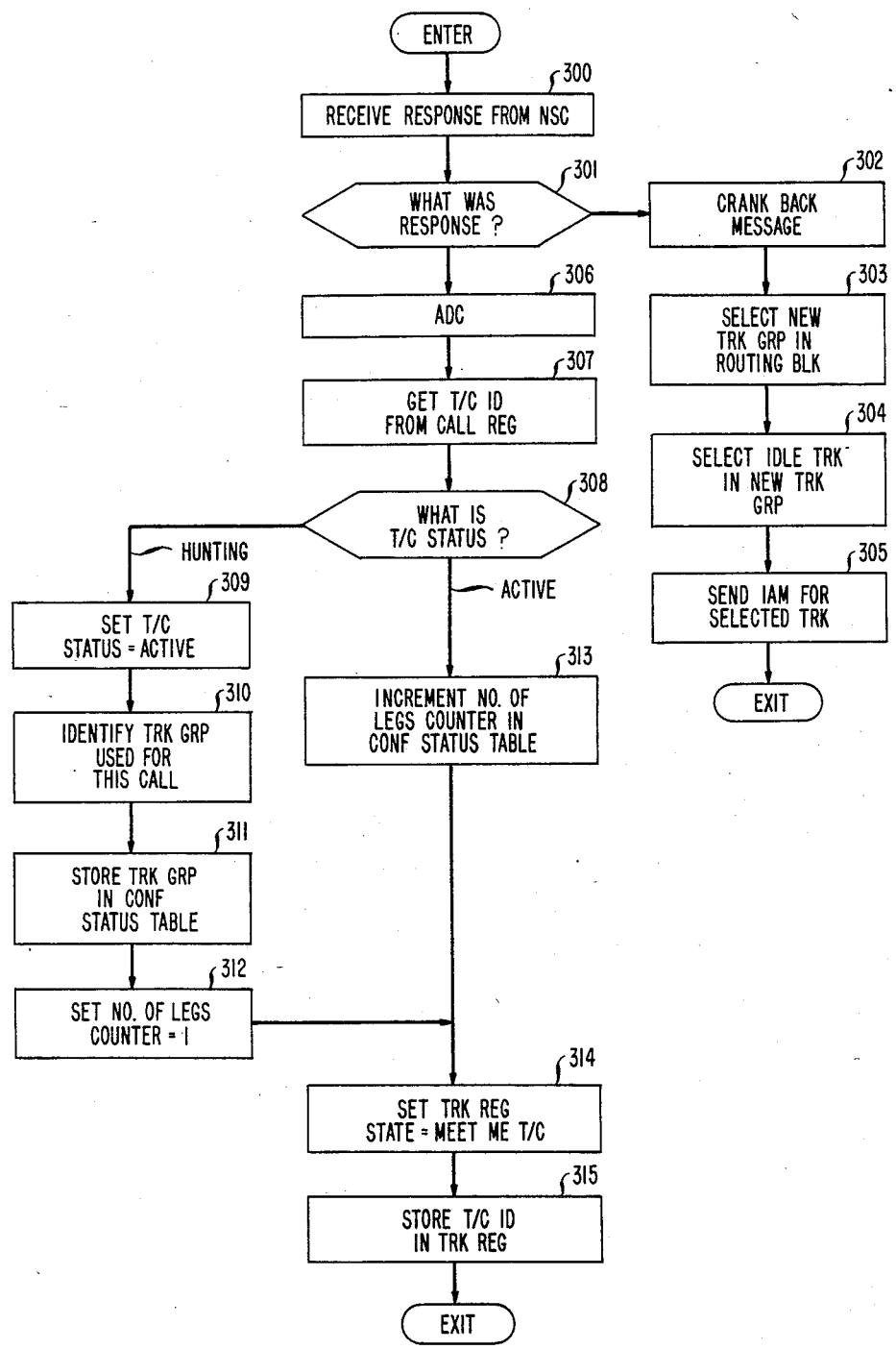

Returning now to a description of the first conferee call, it will be recalled that an idle trunk to network services complex 100 had been selected, and an initial address message had been sent requesting service by that network services complex. A network services complex that is available for service may respond to the host over data link 132 in one of two ways as depicted in FIG. 3. Upon receiving a response (box 300), central control 118 determines if the response is an "address complete" message or a "crankback" message.

The network services complex arrangement is equipped with a crankback feature whereby it can inform the host switching system whether or not it is capable of processing the conference that has been requested. This feature is disclosed in U.S. Pat. No. 4,460,807 of H. A. Kerr et al., issued July 17, 1984, and need not be described in detail herein. Briefly, however, the crankback feature permits the network services complex to examine several of its facilities including the number of available legs, load carrying capacity, etc., to determine if it can process the request for a conference. If the host receives a crankback message as shown in box 302, thereby indicating that the complex cannot accept the conference call, central control selects a new trunk group and an idle trunk in that group (boxes 304 and 305) and thereafter sends an initial address message over the data link for the newly selected trunk to the network services complex coupled thereto.

Let it be assumed, however, that an address complete (ADC) message was received as shown in box 306, thus indicating that the selected network services complex has sufficient facilities to accommodate the conference. Central control 118 now recovers the conference identity from the call register and determines the conference status from the conference status table (boxes 307 and 308). It will be recalled that the conference status had been set to "hunting" since this was the first call to be processed for the conference. Central control 118 now sets the status to "active" and identifies the trunk group and, therefore, the conference bridge used for the first call (boxes 309 and 310). The trunk group number is stored in the conference status table as shown in box 311 and a number of legs counter in that table is set to equal 1 (box 312).

A software register (FIG. 6) associated with the incoming trunk is now updated by central control 118 as shown in boxes 314 and 315. More specifically, the register is set to indicate the outgoing trunk that is engaged in the meet-me conference call, and the identity of the conference is also stored therein. This portion of the program is now exited and central control 118 continues its other tasks of call processing.

Of course, when the host switching office received the address complete message from the network services complex, central control 118 executed the necessary steps to connect the incoming trunk over which the conference request was received to the selected outgoing trunk to the network services complex. Once connected to the complex, the conferee receives an announcement informing the conferee that he or she is now connected to a meet-me conference. The manner in which the call is set up through the switching system 102 is described in the aforementioned September, 1977 issue of the *Bell System Technical Journal,* and the description of how the network services complex provides announcements to the customers is described to the above cited D. E. Herr et al. patent.

During the interval that the first call to the meet-me conference was being processed, and up until the time the conference status was changed to "active", other conferees may have called the access code and found the conference status to be in a "hunting" state (boxes 217 and 218). These calls are held until a conference bridging system has been allocated to the conference and typically a short interval, such as two seconds, would be appropriate to permit the first call to be completed. Should the central control 118 be unable to complete the first call, the conference status would be reset to "idle" and the next call to be processed for this conference would be treated as the first call. Central control 118 would then repeat the process previously described. At the end of the time limit that the subsequent call was put on "hold", central control 118 resumes processing the call by executing boxes 204–210 in FIG. 2. Presumably, the first call would have been completed by this time, and the conference status would now be set to "active", causing central control 118 to execute box 214 in order to obtain the identity of the trunk group associated with the bridge being used for this conference.

In executing boxes 214, central control 118 is forced to select the same trunk group and therefore, the same network services complex that was selected on the first call. Having selected the trunk group, central control 118 selects an idle trunk (box 215) and transmits an initial address message over the data link to the network services complex (box 216). All subsequent calls from conferees are treated in the same manner until all conferees have been added to the bridge.

When a conferee disconnects, central control 118 is made aware of this by a change in the supervisory state of the incoming trunk or upon the receipt of a "clear forward message" over the CCIS link associated with the incoming trunk.

Upon receiving a disconnect message, as shown in box 400 of FIG. 4, central control 118 examines the trunk register to determine the teleconference identification (box 401). Using the teleconference identification, central control 118 accesses the conference status table (box 402) and decrements the number of legs counter as shown in box 403. Central control 118 then determines if the number of legs counter has reached 0 at which time the conference status will be set to "idle" (box 405). If the counter has not reached 0 indicating other conferees are still connected to the bridge, central control 118 merely exits this portion of the program and continues with its normal routine call processing.

In summary, a conferencing arrangement is disclosed having a plurality of meet-me conference bridging systems. An access code is assigned to each conference and at a prearranged time, all conferees dial the access code for the conference. The first call to arrive at the host office serving the conference systems seeks an idle conference system and all other calls for the same conference are delayed until a conference system capable of serving the conference is found. The other calls are then routed to the conference system allocated to the first call.

It is to be understood that the above-described arrangements are merely illustrative of the application of the principles of the invention. Numerous other arrangements may be devised by those skilled in the art without departing from the spirit and scope of the invention.

What is claimed is:

1. For use in a communication network comprising a plurality of customer stations, a plurality of meet-me conference systems, communication channels and switching means for selectively interconnecting said stations to said conference systems via said communication channels, apparatus for controlling the interconnection of said stations to said conference systems comprising:

means responsive to a request for conference service from one of said stations for designating an access code for a conference, means responsive to the initial receipt of said access code from a particular one of said stations for selecting an idle one of said conference systems and for requesting connection of said particular station to said selected system, and means effective upon the successful connection of said particular station to said selected conference system for designating a group of said communication channels for connecting to said selected conference system other of said stations transmitting said access code.

2. The invention defined in claim 1 wherein said means for selecting and for requesting includes means for blocking the connection of said other stations to a conference system other than said selected one.

3. The invention defined in claim 1 wherein said means for selecting and for requesting includes means for postponing the connecting of said other stations to said selected conference system until said particular station is connected to said selected conference system.

4. The invention defined in claim 3 wherein said means for selecting and for requesting comprises a memory associated with said conference and wherein said means for postponing the connecting of said other stations comprises means for changing the status of said conference in said memory to a hold state.

5. For use in a communication network comprising a plurality of customer stations, a plurality of conference systems, communication channels and switching means for selectively interconnecting said stations to said conference systems via said communication channels, a method for controlling the interconnection of said stations to said conference systems comprising the steps of assigning an access code to a conference upon the receipt of a request from one of the stations for conferencing service, selecting an idle one of said conference systems in response to the receipt of the access code from a first calling one of said stations, interconnecting said first calling station with said selected conference system over one of said communication channels, and designating a particular group of said communication channels for interconnecting said selected conference system with other ones of said stations transmitting said access code.

6. The invention defined in claim 5 further comprising the step of temporarily suspending the interconnecting of said stations transmitting said access code with said selected conference system while said first calling station is being connected to said selected conference system.

7. For use in a communication network comprising a plurality of customer stations, a plurality of meet-me conference systems, communication channels and switching means for selectively interconnecting said stations to said conference systems via said communication channels, apparatus for controlling the interconnection of said stations to a conference system comprising:

means responsive to a request for conference service from one of said stations for assigning an access code to a conference, means responsive to the receipt of said access code from a first calling one of said stations for selecting an idle one of said conference systems, means effective upon the selection of said idle conference system for establishing a first connection between said selected conference system and said first calling station, and means for blocking the interconnection to any of said conference systems of other calling stations transmitting said access code during the establishment of said first connection.

8. The invention defined in claim 7 also including means effective upon the connection of said first calling station to said selected conference system for interconnecting said other calling stations to said selected conference system.

9. The invention defined in claim 8 wherein each of said conference systems is accessible via a corresponding subgroup of communication channels, wherein said means for establishing a first connection comprises means for designating the subgroup which corresponds to said selected conference system for connection to said other calling stations, and wherein means are provided for blocking any station transmitting said access code from interconnection to subgroups other than said designated subgroup.

10. For use in a communications network comprising a plurality of customer stations, a plurality of meet-me conference systems, communication channels and switching means for selectively interconnecting said stations with said conference systems via said communication channels, a method of establishing a conference comprising the following steps:

assigning an access code to a conference, informing designated of said stations to be included in the conference of the access code, transmitting the access code to the switching means from each of said designated stations requesting connection to the conference, and in response to a plurality of concurrently received requests bearing the access code, selecting only one of said requests for call processing and blocking all other requests during the call processing of the selected request.

11. The invention defined in claim 10 further comprising the steps of processing the call associated with the selected request by connecting the station making the request over a communication channel to a selected idle one of said conference systems, and unblocking the other requests bearing the access code by connecting the stations associated therewith to said selected idle conference system.

* * * * *